United States Patent
Chacko et al.

(10) Patent No.: US 10,755,864 B2
(45) Date of Patent: Aug. 25, 2020

(54) CATHODE MATERIALS CONTAINING CORE SHELL NANOPARTICLES

(71) Applicant: KEMET Electronics Corporation, Simpsonville, SC (US)

(72) Inventors: Antony P Chacko, Simpsonville, SC (US); John Joseph Ols, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

(21) Appl. No.: 16/459,089

(22) Filed: Jul. 1, 2019

(65) Prior Publication Data

US 2019/0326063 A1    Oct. 24, 2019

Related U.S. Application Data

(62) Division of application No. 14/993,374, filed on Jan. 12, 2016, now Pat. No. 10,381,167.

(60) Provisional application No. 62/103,901, filed on Jan. 15, 2015, provisional application No. 62/105,028, filed on Jan. 19, 2015.

(51) Int. Cl.
| | |
|---|---|
| *H01G 9/042* | (2006.01) |
| *H01G 9/15* | (2006.01) |
| *C25D 11/26* | (2006.01) |
| *H01G 9/00* | (2006.01) |
| *H01G 9/028* | (2006.01) |
| *C25D 5/18* | (2006.01) |

(52) U.S. Cl.
CPC .......... *H01G 9/0425* (2013.01); *C25D 11/26* (2013.01); *H01G 9/0036* (2013.01); *H01G 9/028* (2013.01); *H01G 9/15* (2013.01); *C25D 5/18* (2013.01); *H01G 2009/0014* (2013.01)

(58) Field of Classification Search
CPC ............. H01G 9/15; H01G 2009/0014; H01G 9/0036; H01G 9/025; H01G 9/028; H01G 9/0425

See application file for complete search history.

(56) References Cited

U.S. PATENT DOCUMENTS

| | | | | |
|---|---|---|---|---|
| 4,184,192 A | * | 1/1980 | Yoshida | H01G 9/0425 361/532 |
| 4,353,938 A | * | 10/1982 | Sterling | B22F 1/025 118/716 |
| 5,707,763 A | * | 1/1998 | Shimizu | C08F 259/08 429/217 |
| 2006/0148963 A1 | * | 7/2006 | Dion | B82Y 30/00 524/495 |
| 2006/0215352 A1 | * | 9/2006 | Take | H01G 9/012 361/523 |
| 2008/0131776 A1 | * | 6/2008 | Sakuma | C08F 259/08 429/217 |
| 2010/0149729 A1 | * | 6/2010 | Nishioka | B22F 1/02 361/525 |
| 2010/0209690 A1 | * | 8/2010 | Sang | B82Y 30/00 428/221 |

(Continued)

*Primary Examiner* — Scott B Geyer

(74) *Attorney, Agent, or Firm* — Joseph T. Guy; Patent Filing Specialist, Inc.

(57) ABSTRACT

Provided herein is a capacitor, and method for forming a capacitor, comprising an anode, a dielectric over the anode; a cathode over the dielectric; and the cathode comprises core shell particles.

28 Claims, 2 Drawing Sheets

(56) References Cited

U.S. PATENT DOCUMENTS

| | | | |
|---|---|---|---|
| 2012/0229955 A1* | 9/2012 | Biler | H01G 9/0036 |
| | | | 361/529 |
| 2013/0314845 A1* | 11/2013 | Chacko | H01G 9/04 |
| | | | 361/502 |
| 2015/0009606 A1* | 1/2015 | Mishima | H01G 9/045 |
| | | | 361/532 |

* cited by examiner

CATHODE MATERIALS CONTAINING CORE SHELL NANOPARTICLES

RELATED APPLICATION

This application is a divisional application of pending U.S. patent application Ser. No. 14/993,374 filed Jan. 12, 2016 which, in turn, claims priority to U.S. Provisional Patent Application No. 62/103,901 filed Jan. 15, 2015 and to U.S. Provisional Patent Application 62/105,028 filed Jan. 19, 2015 all of which are incorporated herein by reference.

BACKGROUND

The present invention is related to an improved method of forming cathode materials and an improved capacitor formed thereby. More specifically, the present invention is related to an improved capacitor with improved reliability.

The construction and manufacture of solid electrolytic capacitors is well documented. In the construction of a solid electrolytic capacitor a valve metal preferably serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials, such as polyaniline, polypyrrole, polyethylenedioxythiophene and their derivatives. Solid electrolytic capacitors with intrinsically conductive polymers as the solid cathode electrolyte material have been widely used in the electronics industry due to their advantageous low equivalent series resistance (ESR) and "non-burning/non-ignition" failure mode. In the case of conductive polymer cathodes, the conductive polymer is typically applied by chemical oxidation polymerization, electrochemical oxidation polymerization, prepolymerized dispersion, etc. with other less desirable techniques being reported. U.S. Pat. No. 7,563,290, which is incorporated herein by reference, describes the polymer slurry or conducting polymer dispersion process. The resulted capacitors show excellent high voltage performances, reduced DC leakage (DCL) and improved long term reliability. However, the conductive polymer dispersions have relatively high moisture sorption in comparison with in-situ polymerized conductive polymer. U.S. Pat. No. 8,902,567, which is incorporated herein by reference, describes various methods to manage moisture in solid electrolytic capacitors.

In addition to the conducting polymer solid electrolyte, the cathodic layer of a solid electrolyte capacitor typically consists of several layers, which are external to the solid cathode electrolyte. These extended layers typically include a carbon containing layer and a layer comprising a conductive metal either formed by electrodeposition or the metal is bound in polymer or resin matrix such as in a metal filled adhesive. The metal layer is then attached to a cathode lead by a conductive adhesive. The layers including the solid cathode electrolyte, conductive adhesive and layers there between are referred to collectively herein as the cathode layer which typically includes multiple layers designed to allow adhesion on one face to the dielectric and on the other face to the cathode lead. A highly conductive metal lead frame is used as a cathode lead for negative termination. The various layers connect the solid electrolyte to the outside circuit and also serve to protect the dielectric from thermomechanical damage that may occur during subsequent processing, board mounting, or customer use.

The conductive particles, such as the carbon or metal, in the cathode layers are typically held together by binders including monomeric, oligomeric or polymeric materials or resins. The binder also helps to form adhesive bonds between the highly conductive cathode layer and the lead frame. On exposure to humidity, moisture sorbed by the binder, or by the conductive particles themselves in the case of conductive polymer dispersions, tends to swell the layers causing an increase in ESR due to either delamination or an increase in the distance between conductive particles. Another weakness of the binder is that they tend to degrade at high temperatures and high humidity, which affects the cathode connection integrity. One method to improve the integrity of these binders is to use thermoset binders instead of thermoplastic binders. Thermoset resin based encapsulants are used in solid electrolytic capacitors for their thermal, chemical, and environmental stability. However the high crosslinking density of unfilled thermoset resins makes them inherently brittle. This brittleness of thermoset resin is one of the major obstacles preventing their wider use in cathode layers in solid electrolytic capacitors. To overcome the lack of toughness, thermoplastic polymers have been incorporated into thermoset resins for toughening.

U.S. Pat. No. 8,767,378, which is incorporated herein by reference, claims an electrically conductive paste composition comprising binder resins comprising aliphatic thermoplastic resin and self-polymerizing thermosetting resin. WO Patent application No. 2013111438, which is incorporated herein by reference, claims a conductive paste where the resin group consist of butyral resins, acrylic resins, epoxy resins, phenoxy resins, phenol resins, amino resins, and urethane resins. U.S. Pat. Application No 20150009606, which is incorporated herein by reference, claims the electrode layer is formed from a conductive paste that includes at least a conductive filler, a thermosetting resin containing a thermoplastic resin such as phenoxy resin, and a curing agent.

Studies suggest that increasing the degree of crosslinking decreases ESR shift when capacitors are exposed to high humidity conditions. However, heavily crosslinked thermoset coatings are more susceptible to cracking under thermomechanical stress such as those stresses caused by surface mount technology (SMT) and subsequent operational thermal shock. Another disadvantage of thermoset systems is that they are typically low molecular weight and are low viscosity materials. The low MW/low viscosity binder properties lead to faster settling of conductive particles. Thermoplastics with high molecular weight and high viscosity binders, such as polyacrylic, polyester, polyvinyl butyral, phenoxy, polyurethane are known in the art as additives to the thermoset polymers, such as phenolic, and although this improves the coverage and processability, humidity caused ESR shift will increase due to a lower degree of crosslinking and thus a faster diffusion of moisture into the cathode.

However, the use of thermoplastic polymers in thermoset resins reduces moisture barrier properties, stiffness, strength, and creep resistance of the toughened polymer system. Thus, a need exists for an improved method of toughening thermoset polymers in cathode layers without affecting the moisture barrier, humidity, thermal, and other environmental properties. An improved capacitor, and method of making the capacitor, are provided herein.

SUMMARY

It is an object of the invention to provide an improved solid electrolytic capacitor.

It is another object of the invention to provide an improved method of preparing solid electrolytic capacitors having cathode layers with improved resistance to fracture and moisture permeability.

It is another object of the invention to provide an improved method of preparing a solid electrolytic capacitor with improved humidity resistance and thermal stability.

It is another object of the invention to provide an improved method of preparing solid electrolytic capacitors with cathode layers comprising materials which enhance the performance of thermoset polymers.

These and other advantages, as will be realized, are provided in a capacitor comprising an anode, a dielectric over the anode; a cathode over the dielectric; and the cathode comprises core shell particles.

Yet another embodiment is provided in a conductive formulation comprising a conductor, primary core shell particles and secondary core shell particles.

Yet another embodiment is provided in a method of forming a capacitor comprising the steps of:
forming a dielectric on an anode;
forming a cathode layer on the dielectric wherein the cathode comprises core shell particles and a resin; and
treating the cathode layer to crosslink the core shell particles with the resin.

DESCRIPTION

The present invention is related to an improved capacitor and a method for making the improved capacitor. More specifically, the present invention is related to an electrolytic capacitor with a cross-linked matrix within at least one cathode layer yet without the high ESR typically associated with cross-linking. More specifically, the present invention is related to an electrolytic capacitor comprising a cathode wherein the cathode has core-shell particles therein wherein the core-shell particles have a flexible core and a reactive resin shell wherein the shell cross-links with the binder to improve flexibility. The reactive resin shell comprises functional groups selected from the group consisting of epoxy, carboxylic, phenolic, hydroxyl, amino, amide, isocyanate, thiol, imide, mercapto, sulfone, urethane, cyanate, ester, acrylic, anhydride, urethane, nitro, silane and sulphonic acid.

The core-shell nanocomposites and nanostructure may have different sizes and different shapes of core and shell thickness with different surface morphology. They may be spherical, centric, eccentric, star-like, or tubular in shape. Whenever the surface of the nanoparticles is modified by functional groups, or coated with a thin layer of other materials with different constituents, they show enhanced properties compared to the nonfunctionalized uncoated particles.

The invention will be described with reference to the figures forming an integral component of the invention. Throughout the various figures similar elements will be numbered accordingly.

Figure 1:
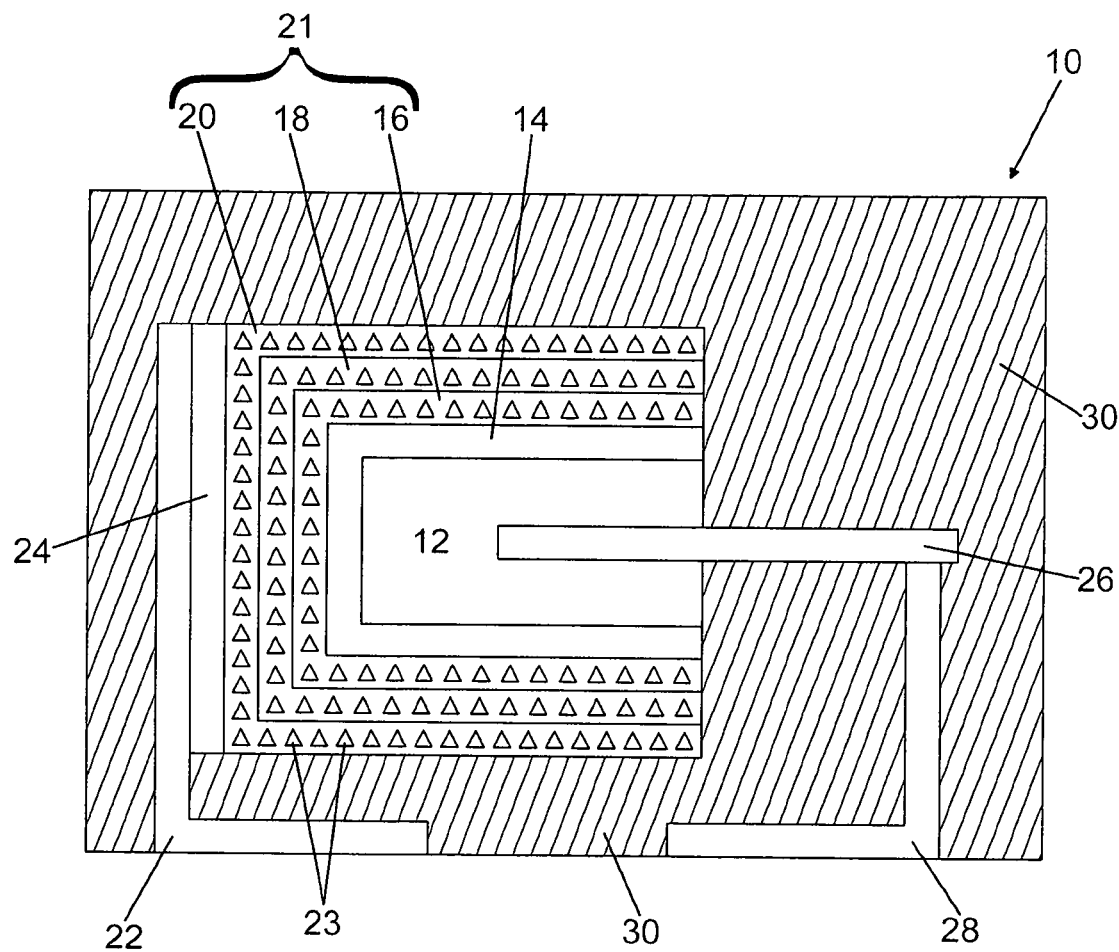
FIG. 1 is a schematic representation of an embodiment of the invention in cross-sectional schematic view.

The invention will be described with reference to FIG. 1 wherein an electrolytic capacitor is illustrated in cross-sectional schematic view. In FIG. 1, the capacitor, generally represented at 10, comprises an anode, 12. A dielectric, 14, at least partially encases the anode. A cathode, 21, at least a partially encases the dielectric with the proviso that the cathode and anode are not in direct electrical contact. The cathode, 21, comprises a primary conductive layer, 16, preferably comprising an intrinsically conducting polymer. It is well known in the art that forming an electrical bond between a cathode lead, 22, and a conducting polymer layer is difficult and it is therefore preferable to include within the cathode structure at least one transition region, 18 and 20, including a first layer, 18, which readily adheres to the conductive layer, 16, and a second layer, 20, wherein the second layer readily adheres to the first layer and can be attached to the cathode lead such as by a conductive adhesive or weld, 24, as known in the art. The first layer is preferably a carbon containing layer and the second layer is preferably a metal containing layer. An anode wire, 26, preferably extends from the anode, 12, wherein the anode wire is in electrical contact with an anode lead, 28. The entire assembly is preferably encased in a non-conductive material, 30, such as a resin, except for a portion of the cathode lead and anode lead remaining exposed for mounting to circuit traces and the like. Core shell particles, 23, are included in at least one of the cathode layers and preferably at least one of the primary conductive layer, 16, the first layer, 18 or the second layer, 18. It is most preferable that the core shell particles are in at least the first layer.

Figure 2:
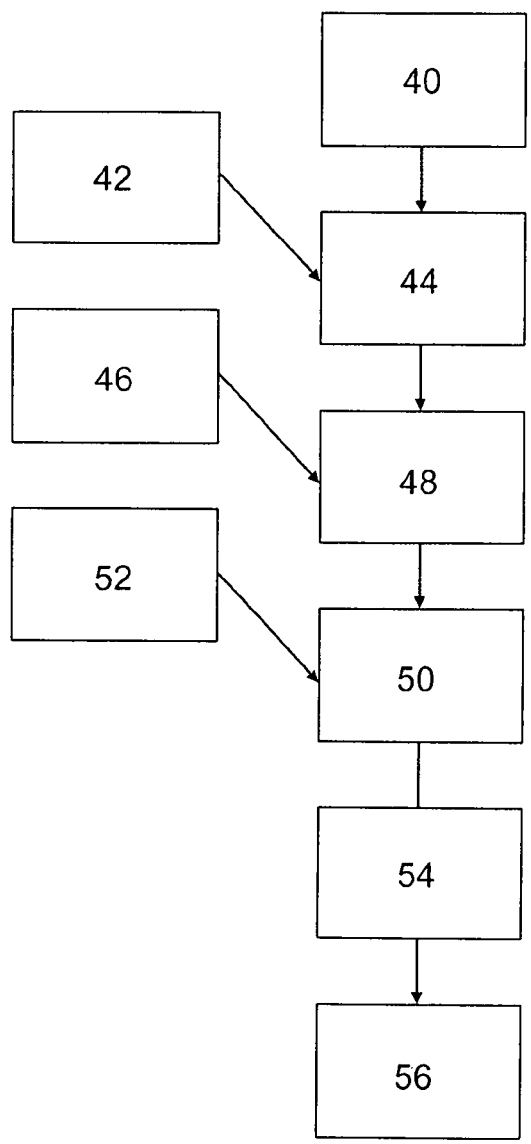
FIG. 2 is a flow chart representation of an embodiment of the invention.

An embodiment of the invention will be described with reference to FIG. 2 wherein the method for making a capacitor is illustrated by flow chart representation. In FIG. 2, an anodized anode is provided at 40 wherein the anodized anode has an anode wire extending therefrom. A first conductive formulation is formed at 42 wherein the first conductive formulation comprises an intrinsically conductive polymer, a polyanion and optionally core shell particles. A coating of the first conductive formulation is formed on the anodized anode at 44 such as by dipping thereby forming the primary conductive layer. It is preferable to apply the first conductive formulation several times to insure adequate thickness of the primary conductive layer preferably with drying between applications. A second conductive formulation is formed at 46 wherein the second conductive formulation comprises conductive particles, and preferably conductive carbon particles, in a resin. The second conductive formulation optionally, and preferably, comprises core shell particles. The second conductive carbon formulation may optionally comprise crosslinkers. The second conductive formulation is coated on the primary conductive layer at 48, preferably by dipping, thereby forming a first layer of the cathode. The second conductive formulation may be applied multiple times to insure adequate thickness of the first layer of the cathode. A second layer of the cathode is formed at 50. In one embodiment the second layer is a metal layer formed by electrodeposition, preferably with reverse bias, thereby forming a plated metal layer as the second layer of the cathode. Alternatively, a third conductive formulation is prepared at 52 wherein the third conductive formulation comprises a metal in a resin and optionally core-shell particles. The third conductive formulation is applied to the first layer of the cathode thereby forming the second layer of the cathode. The capacitor is treated, such as by heating, at 54 to facilitate crosslinking of the core shell particles with the resin of the layer in which the core shell particles are included. The capacitor is finished at 56 including the attachment of cathode and anode lead frames and optional, but preferable, encapsulation of the capacitor in a non-conductive resin wherein the resin may also include core shell particles if desired.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably, the anode comprises at least one material selected from the group consisting of Al, Ta, Nb and NbO with tantalum being most preferred.

The anode wire is most preferably constructed of the same material as the anode. The anode wire can be welded onto the anode surface under protective atmosphere or inserted into a powder prior to compression of the powder to form a porous anode body with the anode wire embedded therein.

The dielectric is a non-conductive layer which is not particularly limited herein. The dielectric may be a metal oxide or a ceramic material. A particularly preferred dielectric is an oxide of an anode metal due to the simplicity of formation and ease of use. It is most desirable that the dielectric of the anode material be formed by dipping the valve metal into an electrolyte solution while applying a positive voltage to the valve metal thereby forming the oxide. The formation electrolytes are not particularly limiting herein. Preferred electrolytes for the formation of the oxide on the tantalum metal include diluted inorganic acids such as sulphuric acid, nitric acid, phosphoric acids or aqueous solutions of dicarboxylic acids, such as ammonium adipate. Other materials may be incorporated into the oxide such as phosphates, citrates, etc. to impart thermal stability or chemical or hydration resistance to the oxide layer.

The conductive polymer layer is preferably formed by dipping the anodized valve metal anodes into a slurry of intrinsically conductive polymer. It is preferred that the anode be dipped into the slurry from 1 to 15 times to insure internal impregnation of the porous anodes and formation of an adequate external coating. The anode should remain in the slurry for a period of about 0.5 minutes to 2 minutes to allow complete slurry coverage of its surface.

The conductive polymer is preferably selected from polyaniline, polypyrrole and polythiophene or substitutional derivatives thereof.

A particularly preferred conducting polymer is represented by Formula I:

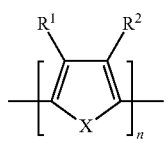

FORMULA 1 wherein $R^1$ and $R^2$ are preferably chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups be small to avoid steric interferences. For these reasons $R^1$ and $R^2$ taken together as —O—$(CH_2)_2$—O— is most preferred. In Formula 1, X is S or N and most preferable X is S. A particularly preferred conductive polymer is polymerized 3,4-polyethylene dioxythiophene (PEDT).

$R^1$ and $R^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or OR3; or R1 and R2, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements. R3 preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can also be incorporated in the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

Other adjuvants, coatings, and related elements can be incorporated into a capacitor, as known in the art, without diverting from the present invention.

The first layer of the transition region preferably comprises conductive carbon in resin and serves as a chemical barrier between the solid electrolyte and the second layer, which preferably comprises a conductive metal. The conductive carbon is preferably selected from carbon fibers, carbon black, graphite, fullerene and carbon nanotubes. Critical properties of the first layer include adhesion to the underlying primary cathode layer, wetting of the underlying primary cathode layer to achieve uniform coverage, penetration into the underlying layer, bulk conductivity, interfacial resistance, compatibility with the second layer, appropriate buildup, and suitable mechanical properties. Preferred resins for the carbon layers are polymers of materials selected from the group phenolic, phenoxy, epoxy, acrylic, cellulose derivatives, aromatic cyanate esters, diallyl isophthalate, bismaleimide, polyimides, polyamide imides, polysulfones, polyphylenes, polyether sulfones, polyaryl ethers, polyphenylene sulfides, polyarylene ether ketones, polyether imides, polyquinoxalines, polyquinolines, polybenzimidazoles, polybenzoxazoles, polybenzothiazoles, and silicones such as silicone polyester and silicone epoxy. More preferably the resin is selected from cellulose derivatives, acrylic, polyester, aromatic cyanate ester, epoxy, phenolic, diallyl isophthalate, phenoxy, polyimide and bismaleimide.

The second layer, which preferably comprises a metal, serves to conduct current from the lead frame to the cathode and around the cathode to the sides not directly connected to the lead frame. The critical characteristics of this second layer are high conductivity, adhesive strength to the carbon layer, wetting of the carbon layer, and acceptable mechanical properties. The metal is preferably a metal particle preferably selected from silver, copper, nickel, indium, tin, palladium, gold, silver coated metal particles, tin coated metal particles, palladium coated metal particles, gold coated metal particles, their alloys, blends, and their mixtures and may be a metal within a matrix or a plated metal. A plated metal formed by reverse bias is particularly suitable for demonstration of the invention. The plated metal layer is preferably applied to the metal filled layer. Plating can be done with various metallic systems. Nickel is a preferred metal system. Plating can be done either by electroplating or electroless plating. Electroplating is preferred due to the lower production cycle time. Conductive adhesive is typically used to adhesively attach the metal layer to the lead frame which acts as the cathode lead or to a circuit trace. The thickness of the plated metal layer is preferably at least 2 microns to no more than 100 microns. Below about 2 microns there may not be complete coverage of the capacitor with nickel due to surface roughness of the underlying cathode. Above about 100 microns there is no further advantage offered and any additional material increases material cost and processing time.

The core shell particles comprise an inner flexible core with a reactive surface wherein the reactive surface is crosslinkable with the thermoset polymer binder of the cathode layer within which the core shell particles are employed. The reactive surface preferably comprises a material selected from the group consisting of epoxy, carboxylic, phenolic, hydroxyl, amino, amide, isocyanate, thiol, imide, mercapto, sulfone, urethane, cyanate, ester, acrylic, anhydride, urethane, nitro, silane and sulphonic acid The core comprises crosslinked rubbery molecules such as polybutadiene, styrene butadiene rubber, acrylic, siloxane, silicone, urethane, etc.

It was surprisingly found that core shell rubber (CSR) particles with a thermoset shell when used with a thermoset polymer can significantly improve the humidity performance of cathode layers. When these core shell rubber particles are used in a thermoset matrix in the cathode layers, the epoxy functionality of the CSR particles and the reactive functionality of the thermoset matrix react together to form a toughened thermoset with well dispersed nanoparticle networks. While not limited to theory, it is hypothesized herein that the external shell of the core shell particles crosslink with the thermoset matrix while the flexible core allows the crosslinked matrix to accommodate thermal stress thereby decreasing cracks thereby providing excellent humidity performance.

It is preferable that at least one of the first layer of the cathode and the second layer of the cathode be crosslinked either in addition to the crosslinking that occurs with the incorporation of the core shell particles or without the incorporation of core shell particles. Particularly preferred crosslinkers include of epoxy, carboxylic, phenolic, hydroxyl, amino, imide, mercapto, urethane, sulfone, thiol, cyanate ester, acrylic, silane, siloxane, and sulphonic acid.

The average particle size of the core shell particles with the epoxy functionality is preferably at least 50 nm to no more than about 500 nm. Below about 50 nm the materials are difficult to handle in a manufacturing environment as the small particles are easily transported by moving air. Above about 500 nm the particles limit the layer thickness which is not desirable. More preferably, the core shell particles have an average particle size of no more than 150 nm. Core shell particles with an average particle size on the order of about 100 nm are particularly suitable for demonstration of the invention.

The core shell particles are incorporated in the layer in a sufficient amount to provide a flexible matrix yet not at such an amount as to limit the amount of conductor. The core shell particles are preferably used in an amount of at least 1 wt % to no more than 50 wt % based on the total solids in the layer. Below about 1 wt % the amount is insufficient to provide adequate protection against thermal stress and humidity. Above about 50 wt % the conductivity is mitigated which is contrary to the function of the layer. More preferably the core shell particles are used in an amount of at least 5 wt % to no more than 20 wt % based on the total solids in the layer.

In another embodiment, a secondary core shell particle can be utilized wherein the secondary core shell particles comprise a core selected from metal, graphene, organic, polymer, or an inorganic.

EXAMPLES

Comparative Example 1

A series of tantalum anodes (68 uF, 16V) using two different sets of anodes was prepared. The tantalum was anodized to form a dielectric on the tantalum anode. The anodized anode was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodes. This process was repeated 3 times. A conductive polymer dispersion was applied to form a thick external polymer layer. The anodes were washed and a conventional graphite coating comprising a thermoset resin was applied followed by a conventional silver layer comprising a mixture of thermoset resin and a thermoplastic resin. Parts were assembled, aged, and surface mounted and exposed to bias highly accelerated stress test (BHAST) at 125° C., 85% RH and 1.71 atm for various times as set forth in Table 1. ESR was measured before and after exposure to BHAST conditions.

Inventive Example 1

Parts were prepared in the same manner as in Comparative Example 1 except that the prior art graphite coating was replaced with a graphite layer comprising a CSR.

The carbon formulation was prepared from commercial thermoset phenolic resin, a core shell rubber particle, carbon black and graphite. The core shell rubber particle was obtained commercially from Kaneka as MXCA1 comprising polybutadiene core and cycloaliphatic epoxy shell. Commercially available carbon black obtained from Cabot and graphite from Asburry graphite was used for the carbon layer. Parts were assembled, aged, and surface mounted as conventional in the art and the assembled part was exposed to the same BHAST conditions as Comparative Example 1 and the ESR was measured before and after exposure to BHAST conditions. The results are presented in Table 1.

Inventive Example 2

Parts were prepared in the same manner as in Inventive Example 1 except that the silver layer was replaced with a silver layer comprising CSR.

The silver layer was prepared from a commercial thermoset phenolic resin, the core shell rubber particle from Kaneka as used in Inventive Example 1 for the carbon layer, and silver flake particles from Ames Advanced Material Corporation. Parts were assembled, aged, and surface mounted in accordance with Inventive Example 1 and the finished capacitors were exposed to the same BHAST conditions as Inventive Example 1. ESR was measured before and after exposure to BHAST conditions. The results are provided in Table 1.

TABLE 1

Comparison of bias HAST ESR shift for prior art and inventive

|  | Initial ESR (milliohm) | Post BHAST 63 hrours (milliohm) | % ESR shift (post 63 hrs) | Post BHAST 200 hours (milliohm) | % ESR shift (post 200 hrs) |
|---|---|---|---|---|---|
| Prior art | 26 | 102 | 292 | 2401 | 9135 |
| Inventive example 1 | 27 | 44 | 63 | 67 | 148 |
| Inventive example 2 | 25 | 39 | 56 | 69 | 176 |

The results presented in Table 1 clearly demonstrate the improvements in ESR on exposure to humidity offered by the incorporation of core shell rubber particles.

The invention has been described with particular emphasis on the preferred embodiments. One of skill in the art would realize additional embodiments, alterations, and advances which, though not enumerated, are within the invention as set forth more specifically in the claims appended hereto.

The invention claimed is:

1. A method of forming a capacitor comprising the steps of:
   forming a dielectric on an anode;
   forming a cathode layer on said dielectric wherein said cathode comprises core shell particles and a resin; and
   treating said cathode layer to crosslink said core shell particles with said resin wherein said resin is selected from thermoplastic resin or thermoset resin.

2. The method of forming a capacitor of claim 1 wherein said forming of said cathode comprises forming a primary conductive layer with said core shell particles in said primary conductive layer.

3. The method of forming a capacitor of claim 2 wherein said primary conductive layer comprises a conductive polymer.

4. The method of forming a capacitor of claim 3 wherein said conductive polymer is selected from the group consisting of polyaniline, polypyrrole and polythiophene.

5. The method of forming a capacitor of claim 4 wherein said polythiophene is polymerized 3,4-polyethylene dioxythiophene.

6. The method of forming a capacitor of claim 1 wherein core shell particles have an average particle size of no more than 500 nm.

7. The method of forming a capacitor of claim 6 wherein core shell particle have an average particle size of no more than 150 nm.

8. The method of forming a capacitor of claim 6 wherein core shell particles have an average particle size of at least 50 nm.

9. A method of forming a capacitor comprising the steps of:
   forming a dielectric on an anode;
   forming a cathode layer on said dielectric wherein said cathode comprises core shell particles and a resin; and
   treating said cathode layer to crosslink said core shell particles with said resin wherein said resin is selected from a polyester, epoxy, phenolic, polyacrylic, polyvinyl butyral, phenoxy, polyimide, bismaleimide, polysiloxane, phenol-formaldehyde, urea-formaldehyde, melamine, polycyanurate, polystyrene sulfonic acid, polyester sulfonate, poly phenol sulfonates, polyurethane, fluoropolymers, silicone, phenolics, vinyl ester, polysulfone, their blends and copolymers.

10. The method of forming a capacitor of claim 9 wherein said forming of said cathode comprises forming a primary conductive layer with said core shell particles in said primary conductive layer.

11. The method of forming a capacitor of claim 10 wherein said primary conductive layer comprises a conductive polymer.

12. The method of forming a capacitor of claim 11 wherein said conductive polymer is selected from the group consisting of polyaniline, polypyrrole and polythiophene.

13. The method of forming a capacitor of claim 12 wherein said polythiophene is polymerized 3,4-polyethylene dioxythiophene.

14. The method of forming a capacitor of claim 9 wherein core shell particles have an average particle size of no more than 500 nm.

15. The method of forming a capacitor of claim 14 wherein core shell particle have an average particle size of no more than 150 nm.

16. The method of forming a capacitor of claim 15 wherein core shell particles have an average particle size of at least 50 nm.

17. A method of forming a capacitor comprising the steps of:
   forming a dielectric on an anode;
   forming a cathode layer on said dielectric wherein said cathode comprises core shell particles and a resin; and
   treating said cathode layer to crosslink said core shell particles with said resin wherein said forming of said cathode comprises forming a transition region comprising at least one of a first layer and a second layer with said core shell particle in said transition region.

18. The method of forming a capacitor of claim 17 wherein said first layer comprises conductive carbon.

19. The method of forming a capacitor of claim 18 wherein said first layer comprises said core shell particles.

20. The method of forming a capacitor of claim 17 wherein said second layer comprises a metal.

21. The method of forming a capacitor of claim 20 wherein said second layer comprises said core shell particles.

22. The method of forming a capacitor of claim 20 wherein said metal is in a coating.

23. The method of forming a capacitor of claim 20 wherein said metal is selected from the group consisting of silver, copper, nickel, indium, tin, palladium and gold.

24. A method of forming a capacitor comprising the steps of:
forming a dielectric on an anode;
forming a cathode layer on said dielectric wherein said cathode comprises core shell particles and a resin; and
treating said cathode layer to crosslink said core shell particles with said resin wherein said core shell particles comprise a core and a polymeric shell and wherein said polymeric shell has at least one reactive group.

25. The method of forming a capacitor of claim 24 wherein said reactive group is selected from the group consisting of epoxy, carboxylic, phenolic, hydroxyl, amino, amide, isocyanate, thiol, imide, mercapto, sulfone, urethane, cyanate, ester, acrylic, anhydride, urethane, nitro, silane and sulphonic acid.

26. The method of forming a capacitor of claim 24 wherein said core comprises crosslinked rubber molecules.

27. The method of forming a capacitor of claim 26 wherein said core comprises a material selected from polybutadiene, polyisoprene, styrene butadiene rubber, silicone, siloxane, polyurethane and acrylic.

28. A method of forming a capacitor comprising the steps of:
forming a dielectric on an anode;
forming a cathode layer on said dielectric wherein said cathode comprises core shell particles and a resin; and
treating said cathode layer to crosslink said core shell particles with said resin wherein said core shell particles comprise a core and a polymeric shell and further comprises a secondary core shell particle comprising a core selected from metal, graphene, organic, polymer, or an inorganic.

* * * * *